(12) United States Patent
Chen et al.

(10) Patent No.: US 8,715,528 B2
(45) Date of Patent: May 6, 2014

(54) LIQUID FLUORESCENT COMPOSITION AND LIGHT EMITTING DEVICE

(75) Inventors: An-Cheng Chen, Hsinchu (TW);
Pei-Chen Huang, Taipei (TW);
Chien-Hsien Cheng, Tainan (TW);
Chun-Ming Wu, Banqiao (TW);
Shih-Hsien Jassy Liu, Jhubei (TW);
Kung-Lung Cheng, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 56 days.

(21) Appl. No.: 12/994,764

(22) PCT Filed: Jan. 13, 2010

(86) PCT No.: PCT/CN2010/070160
§ 371 (c)(1),
(2), (4) Date: Nov. 25, 2010

(87) PCT Pub. No.: WO2010/145211
PCT Pub. Date: Dec. 23, 2010

(65) Prior Publication Data
US 2011/0299021 A1      Dec. 8, 2011

(51) Int. Cl.
C09K 19/20      (2006.01)
C09K 19/30      (2006.01)
C09K 19/54      (2006.01)
G02F 1/1334     (2006.01)
G02F 1/1343     (2006.01)

(52) U.S. Cl.
USPC .............. 252/299.67; 252/299.5; 252/299.63; 349/86; 349/176

(58) Field of Classification Search
USPC ............. 252/299.01, 299.63, 299.66, 299.67, 252/299.5, 299.61; 349/86, 176
See application file for complete search history.

(56) References Cited

U.S. PATENT DOCUMENTS

| 5,251,048 A | 10/1993 | Doane et al. |
| 5,695,682 A | 12/1997 | Doane et al. |
| 5,948,318 A * | 9/1999 | Miyazawa et al. ....... 252/299.63 |
| 2007/0278449 A1 | 12/2007 | Takaku et al. |

FOREIGN PATENT DOCUMENTS

| CN | 1153807 A | 7/1997 |
| JP | 2002285156 A | 10/2002 |
| TW | 200825158 A | 6/2008 |
| TW | 200918538 A | 5/2009 |

OTHER PUBLICATIONS

Office Action (First Examination Opinion) issued by China's State Intellectual Property Office on Aug. 28, 2012, for the above-referenced application's counterpart application in China (Application No. 200910148980.9).
Office Action (Notification of Allowance) issued by the Taiwan Intellectual Property Office on Sep. 4, 2013, for the above-referenced application's counterpart application in Taiwan (Application No. 098117702).

* cited by examiner

*Primary Examiner* — Shean C Wu
(74) *Attorney, Agent, or Firm* — Pai Patent & Trademark Law Firm; Chao-Chang David Pai (57) ABSTRACT

The invention discloses a reflective liquid crystal material formulation, wherein a liquid crystal component of high dielectric anisotropy is employed to lower the driving voltage. By modulating the addition ratio of the high dielectric anisotropy components, reflective liquid crystal compositions of different reflective colors can be driven by a single driving voltage. The invention also provides a reflective bistable display using the above formulation.

18 Claims, 4 Drawing Sheets

LIQUID FLUORESCENT COMPOSITION AND LIGHT EMITTING DEVICE

CROSS REFERENCE TO RELATED APPLICATIONS

This application claims priority of China Patent Application No. 200910148980.9, filed on Jun. 16, 2009, the entirety of which is incorporated by reference herein.

BACKGROUND OF THE INVENTION

1. Field of the Invention

The invention relates to a liquid crystal material and applications thereof, and more particularly to a reflective liquid crystal material formulation and single color, multi-color, or full color reflective bistable liquid crystal displays employing the same.

2. Description of the Related Art

Liquid crystal display (LCD) can include various liquid crystal materials such as twisted nematic (TN) liquid crystals, super twisted nematic (STN) liquid crystals, ferroelectric liquid crystals (FLC), or cholesteric liquid crystals.

Cholesteric liquid crystals, otherwise called chiral nematic liquid crystals, are generally prepared by mixing a twisted nematic liquid crystal with a chiral agent (chiral dopant). Due to the chiral agent, cholesteric liquid crystals exhibit higher twisting angular than that of twisted nematic liquid crystals and super twisted nematic liquid crystals. Cholesteric liquid crystals have several states, including a homeotropic state in which the direction of the liquid crystal molecules is approximately parallel to the substrate, and two stable states of a planar state and a focal conic state with no voltage applied. Cholesteric liquid crystals exhibit a bistable state characteristic, and the two stable states are stable in the absence of an electric field. In the planar state and the focal conic state, the image data can be kept displayed as a still image with no voltage applied, except for the switching of the planar state and the focal conic state.

In the other hand, since cholesteric liquid crystals can reflect the surrounding light and can be used in the absence of backlight source and polarizer, the liquid crystal display employing the same has lower power consumption than normal liquid crystal display. Since the reflectance of liquid crystal composition can be modified depending on desired reflective wavelengths, the requirement of a color display can be achieved in the absence of color filter. The detail driving means and optical characteristics of cholesteric liquid crystals are disclosed in U.S. Pat. No. 5,251,048 and U.S. Pat. No. 5,695,682.

The cholesteric liquid crystal is composed of optically active chiral agent and nematic liquid crystal, with helical pitch controlled by the ratio therebetween. The relationship between helical pitch P and amount of optically active chiral agent is:

$$P = 1/(HTP \cdot C)$$

In the above relational formula, C represents the weight concentration of chiral agent added to the liquid crystal composition and HTP helical twisting power, that is, the twisting and rotating ability of liquid crystal molecules. Therefore, the cholesteric liquid crystal with modifiable reflective wavelength can be obtained by adjusting the concentration of the chiral agent. The cholesteric liquid crystal composition with a higher concentration chiral agent has a lower helical pitch and a shorter reflective wavelength (blue shift).

Figure 1:
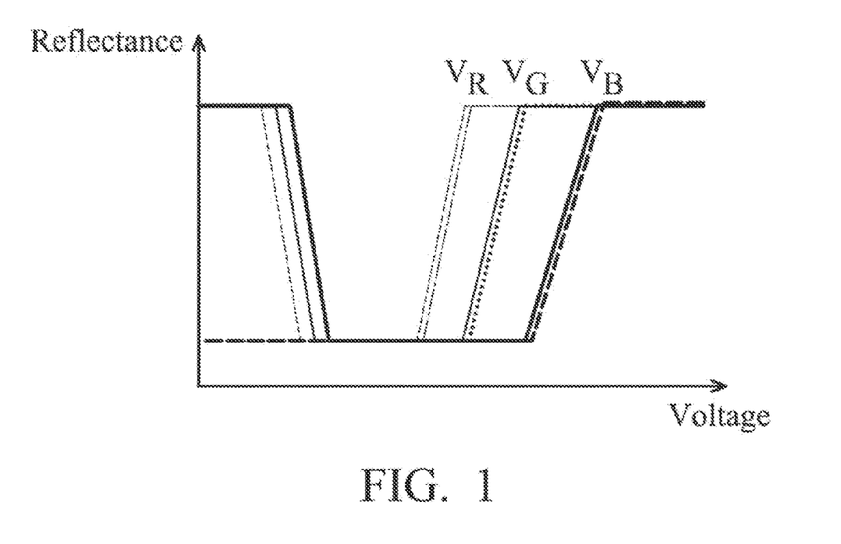
FIG. 1 is a graph plotting the reflectance against driving voltage of conventional RGB cholesteric liquid crystal materials.

The driving voltage, however, increases in direct ratio with the increased concentration of the chiral agent, resulting in various driving voltage among the cholesteric liquid crystal. FIG. 1 is a graph plotting the reflectance of RGB cholesteric liquid crystal materials against driving voltage of RGB cholesteric liquid crystal materials. As shown in FIG. 1, the driving voltages of RGB cholesteric liquid crystal materials $V_R$, $V_G$ and $V_B$ are distinctively different (driving voltage of planar state represented by solid line, and driving voltage of focal conic state). Therefore, in a full-color display, there is necessary to provide three different driving voltages for driving red cholesteric liquid crystal material, green cholesteric liquid crystal material, and blue cholesteric liquid crystal material simultaneously.

There is, therefore, still a need for cholesteric liquid crystal materials with reduced driving voltage. Furthermore, the driving circuit design would be greatly simplified if cholesteric liquid crystal materials with different reflective wavelength are operated by a single driving voltage.

BRIEF SUMMARY OF THE INVENTION

An exemplary embodiment of a reflective liquid crystal material formulation, including at least two of (A) first liquid crystal component, (B) second liquid crystal component, and (C) third liquid crystal component, wherein (A) the first liquid crystal component having a first reflective wavelength includes:
  100 parts by weight of a first liquid crystals host including 100% of a first component; and
  3-10 parts by weight of a first chiral agent;

(B) the second liquid crystal component having a second reflective wavelength includes:
  100 parts by weight of a second liquid crystals host including 60-80% of a first component and 20-40% of a second component; and
  3-10 parts by weight of a second chiral agent; and (C) the third liquid crystal component having a third reflective wavelength includes:
  100 parts by weight of a third liquid crystals host including 10-60% of a first component and 40-90% of a second component; and
  3-10 parts by weight of a third chiral agent, wherein the first component includes a compound represented by formula (I) of and the second component includes a compound represented by formula (III) of wherein $R^1$ is independent and is selected from the group consisting of hydrogen, $C_{1-15}$ straight or branched alkyl group, and $C_{1-15}$ straight or branched alkenyl group; one or more hydrogen atom bonded to the alkyl or alkenyl group is substituted optionally by a halogen atom, cyano group, or perfluoromethyl group; and one or more —CH$_2$— of the alkyl or alkenyl group is substituted optionally by —O—, —S—, A and B are independent and selected from a group consisting of trans-1,4-cyclohexylene, and 1,4-phenylene; one or more —CH$_2$— of A and B is substituted optionally by —O—, or —NH—; one or more =CH— of A and B is substituted optionally by =N—; and one or more hydrogen atom of A and B is substituted optionally by a halogen atom, cyano group, or perfluoromethyl group;

$Z^1$ is independent and is selected from a group consisting of —CH$_2$—, —O—, —S—, —CF$_2$O—, —OCF$_2$—, —CH$_2$CH$_2$—, —CF$_2$CF$_2$—, cis or trans —C=C—, and —C≡C—, and $Z^2$ is independent and is selected from a group consisting of single bond, —CH$_2$—, —O—, —S—, —CF$_2$O—, —OCF$_2$—, —CH$_2$CH$_2$—, —CF$_2$CF$_2$—, cis or trans —C=C—, and —C≡C—;

n is 0 or an integral of 1-3, m is 0 or an integral of 1-3, and the sum of n and m is 1-3; and L is hydrogen or fluorine.

In another exemplary embodiment of the invention, a reflective bistable liquid crystal display includes a first electrode layer; a second electrode layer; the above reflective liquid crystal material formulation disposed between the first electrode layer and the second electrode layer, wherein the liquid crystal components are isolated from each other, and the driving voltage difference of any two liquid crystal components is less than 4V.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The invention provides a reflective liquid crystal material formulation with low driving voltage, wherein liquid crystal components with different reflective colors are modified by adding high dielectric anisotropy liquid crystal material in order to reduce driving voltage.

Figure 2:
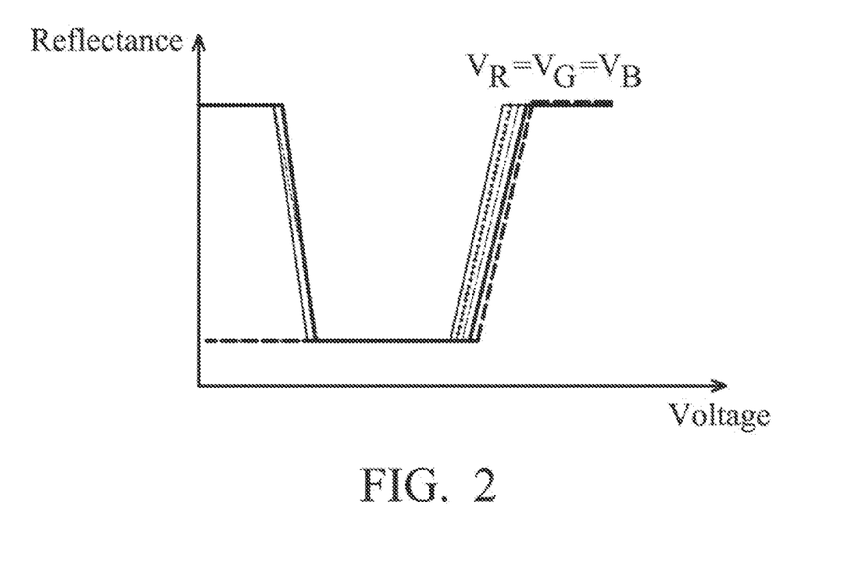
FIG. 2 is a graph plotting the reflectance against driving voltage of RGB cholesteric liquid crystal materials as disclosed in an embodiment of the invention.

By adjusting the ratio between liquid crystal materials with different dielectric anisotropy, the cholesteric liquid crystal material formulation with different color liquid crystal components has a single driving voltage, referring to FIG. 2.

The cholesteric liquid crystal material of the invention can have a reflective wavelength in the range of visible light (380 nm-800 nm), and can be employed in single color or multi color liquid crystal display. The cholesteric liquid crystal components of the invention can have a helical pitch less than 1 um and of between 0.2-0.5 um. The cholesteric liquid crystal components of the invention are described as below in detail.

The liquid crystal materials of the invention can be generally divided into two groups, namely, first component with relatively low dielectric anisotropy (Group I), and second component with relatively high dielectric anisotropy (Group II).

In an embodiment, the first component has a dielectric anisotropy, for example, less than 20, and the second component has a dielectric anisotropy, for example, more than 20.

In another embodiment, the first component has a dielectric anisotropy, for example, less than 15, and the second component has a dielectric anisotropy, for example, equal to or more than 15. Namely, one of the first and second components has a relatively low dielectric anisotropy, and the other has a relatively high dielectric anisotropy.

The first component at least includes a compound represented by formula (I), and can optionally further include a compound represented by formula (II).

(I)

$R^1$ is independent and is selected from the group consisting of hydrogen, $C_{1-15}$ straight or branched alkyl group, and $C_{1-15}$ straight or branched alkenyl group; one or more hydrogen atom bonded to the alkyl or alkenyl group is substituted optionally by a halogen atom, cyano group, or perfluoromethyl group; and one or more —CH$_2$— of the alkyl or alkenyl group is substituted optionally by —O—, —S—,

A and B are independent and selected from a group consisting of trans-1,4-cyclohexylene, and 1,4-phenylene; one or more —CH2— of A and B is substituted optionally by —O—, or —NH—; one or more =CH— of A and B is substituted optionally by =N—; and one or more hydrogen atom of A and B is substituted optionally by a halogen atom, cyano group, or perfluoromethyl group.

$Z^1$ is independent and is selected from a group consisting of —$CH_2$—, —O—, —S—, —$CF_2O$—, —$OCF_2$—, —$CH_2CH_2$—, —$CF_2CF_2$—, cis or trans —C=C—, and —C≡C—, and $Z^2$ is independent and is selected from a group consisting of single bond, —$CH_2$—, —O—, —S—,

—$CF_2O$—, —$OCF_2$—, —$CH_2CH_2$—, —$CF_2CF_2$—, cis or trans —C=C—, and —C≡C—; and n is 0 or an integral of 1-3, m is 0 or an integral of 1-3, and the sum of n and m is 1-3.

The first component can optionally further include a compound represented by formula (II).

(II)

$R^1$, A, B, $Z^1$, $Z^2$, n, and m are as previously defined; $R^2$ is selected from the group consisting of hydrogen, $C_{1-15}$ straight or branched alkyl group, and $C_{1-15}$ straight or branched alkenyl group, one or more hydrogen atom bonded to the alkyl or alkenyl group is substituted optionally by a halogen atom, cyano group, or perfluoromethyl group; and one or more —$CH_2$— of the alkyl or alkenyl group is substituted optionally by —O—, —S—,

For the compound represented by formula (II), since the terminal CN group of the compound represented by formula (I) is replaced by $R^2$ group, the compound represented by formula (II) has relatively low dielectric anisotropy in comparison with the compound represented by formula (I). In general, the compound represented by formula (I) has a dielectric anisotropy of between 5 to 20, and the compound represented by formula (II) has a dielectric anisotropy of between −5 to 5. The compound represented by formula (II) employed in the liquid crystal material formulation is used to adjust the temperature range of liquid crystal phase and reduce the bulk viscosity of the liquid crystal material formulation. The first component can optionally include the compound represented by formula (II). Alternatively, the first component consists of the compound represented by formula (I).

The second component at least includes the compound represented by formula (III), and can optionally further include a compound represented by formula (IV).

(III)

$R^1$ is independent and is selected from the group consisting of hydrogen, $C_{1-15}$ straight or branched alkyl group, and $C_{1-15}$ straight or branched alkenyl group; one or more hydrogen atom bonded to the alkyl or alkenyl group is substituted optionally by a halogen atom, cyano group, or perfluoromethyl group; and one or more —$CH_2$— of the alkyl or alkenyl group is substituted optionally by —O—, —S—, A and B are independent and selected from a group consisting of trans-1,4-cyclohexylene, and 1,4-phenylene; one or more —$CH_2$— of A and B is substituted optionally by —O—, or —NH—; one or more =CH— of A and B is substituted optionally by =N—; and one or more hydrogen atom of A and B is substituted optionally by a halogen atom, cyano group, or perfluoromethyl group.

$Z^1$ is independent and is selected from a group consisting of —$CH_2$—, —O—, —S—,

—$CF_2O$—, —$OCF_2$—, —$CH_2CH_2$—, —$CF_2CF_2$—, cis or trans —C=C—, and —C≡C—, and $Z^2$ is independent and is selected from a group consisting of single bond, —$CH_2$—, —O—, —S—, —$CF_2O$—, —$OCF_2$—, —$CH_2CH_2$—, —$CF_2CF_2$—, cis or trans —C=C—, and —C≡C—; n is 0 or an integral of 1-3, m is 0 or an integral of 1-3, and the sum of n and m is 1-3; and L is hydrogen or fluorine.

For the compound represented by formula (III), since one or two hydrogen atoms bonded on the benzene ring of the compound represented by formula (I) is replaced by fluorine atom, the compound represented by formula (III) has relatively high dielectric anisotropy in comparison with the compound represented by formula (I). In general, the compound represented by formula (III) has a dielectric anisotropy of between 15 to 50, thereby increasing the dielectric anisotropy of the liquid crystal material formulation and reducing the driving voltage of the liquid crystal material formulation.

The second component can optionally further include a compound represented by formula (IV).

(IV)

$R^1$, A, B, $Z^1$, $Z^2$, n, and m are as previously defined; X is fluorine, —$CF_3$, and —$OCF_3$; and $L^1$ and $L^2$ are independent and each is hydrogen or fluorine.

For the compound represented by formula (IV), since the terminal CN group of the compound represented by formula (III) is replaced by X group (X is fluorine, —CF, or —$OCF_3$), the compound represented by formula (IV) has relatively low dielectric anisotropy in comparison with the compound represented by formula (III). In general, the compound represented by formula (IV) has a dielectric anisotropy of between 5 to 20.

The compounds represented by formulas (I), (II), (III) and (IV) can be prepared by the methods known to those skilled in the art, such as, those described in U.S. Pat. Nos. 4,229,315, 4,330,426, 4,422,951, 4,536,321, 4,576,733, 4,853,152, and 5,976,404, the contents of which are hereby incorporated by reference.

Generally, the cholesteric liquid crystal material seldom employs the compound represented by formula (IV). Under some specific conditions, the characteristics (such as bulk viscosity, or driving time) of the liquid crystal material formulation can be modified by addition of the compound represented by formula (IV).

In addition to the aforementioned liquid crystal compounds, the liquid crystal material component further includes, but not limited to, at least one of several chiral agents as below. The chiral agents can be commercially available and have structures represented by formula (V)-(VIII).

The chiral agents represented by formulas (V)-(VIII) can be prepared by the methods known to those skilled in the art, such as, those described in U.S. Pat. Nos. 4,780,240, 5,114, 614, 5,139,698, EP0168043, and DE4322905, the contents of which are hereby incorporated by reference.

Other workable chiral agents can include the chiral agents disclosed in U.S. Pat. No. 6,217,792, V. Vill, F. Fischer, and J. Thiem, Zeitschrift Fur Naturfoschung A., Journal of Physical Science, 43a(12), 1119-1125 (1988), GB2328207, U.S. Pat. No. 7,052,743, or U.S. Pat. No. 7,150,900B2, such as compounds having high helical twist power and represented by formula (IX)-(XI)

(IX)

(X)

(V)

(VI)

(VII)

(VIII)

(XI)

R is independent and is selected from the group consisting of hydrogen, $C_{1-15}$ straight or branched alkyl group, and $C_{1-15}$ straight or branched alkenyl group; one or more hydrogen atom bonded to the alkyl or alkenyl group is substituted optionally by a halogen atom, cyano group, or perfluoromethyl group; and one or more —$CH_2$— of the alkyl or alkenyl group is substituted optionally by —O—, —S—, A and B are independent and selected from a group consisting of trans-1,4-cyclohexylene, and 1,4-phenylene; one or more —$CH_2$— of A and B is substituted optionally by —O—, or —NH—; one or more =CH— of A and B is substituted optionally by =N—; and one or more hydrogen atom of A and B is substituted optionally by a halogen atom, cyano group, or perfluoromethyl group.

Z is independent and selected from a group consisting of —$CH_2$—, —O—, —S—,

—$CF_2O$—, —$OCF_2$—, —$CH_2CH_2$—, —$CF_2CF_2$—, cis or trans —C=C—, and —C≡C—; and n is independent and an integral of 1-2.

The reflective liquid crystal material formulation of the invention employs the second component with high dielectric anisotropy to reduce the driving voltage.

Due to the different ratio between the first component and second component, the liquid crystal components with different reflective colors can be operated by a single driving voltage.

For example, in the case of a full-color liquid crystal display, the reflective liquid crystal material formulation of the invention includes:

(A) a first liquid crystal component having a first reflective wavelength (such as red light) includes:
100 parts by weight of a first liquid crystals host including 100% of a first component; and
3-10 parts by weight of a first chiral agent;

(B) second liquid crystal component having a second reflective wavelength (such as green light) includes:
100 parts by weight of a second liquid crystals host including 60-80% of a first component and 20-40% of a second component; and
3-10 parts by weight of a second chiral agent.

(C) a third liquid crystal component having a third reflective wavelength includes:
100 parts by weight of a third liquid crystals host including 10-60% of a first component and 40-90% of a second component; and
3-10 parts by weight of a third chiral agent.

As shown in FIG. 1, the relationship of RGB liquid crystal component driving voltages in a conventional liquid crystal formulation is $V_B > V_G > V_R$. In order to reduce the driving voltage, the second (green) liquid crystals host has 20-40% the second component with high dielectric anisotropy and the third (blue) liquid crystals host has 40-90% the second component with high dielectric anisotropy. Therefore, the cholesteric liquid crystal components with different reflective wavelengths have the same or similar driving voltage. In an embodiment, the first (red) liquid crystal host has a dielectric anisotropy less than 20 (such as 15-18), the second (green) liquid crystal host has a dielectric anisotropy of between 20-25, and the third (blue) liquid crystal host has a dielectric anisotropy of between. In this way, the driving voltage difference between two or more liquid crystal components with different reflective wavelengths can be less than 4V, more preferably less than 3V, and most preferably less than 1V.

It should be noted that the aforementioned liquid crystal components (A), (B), and (C) can respectively have the same or different first components and second components. Further, the first, second, and third chiral agents can be selected from the compounds represented by formula (V)-(XI) or other known chiral agents.

As discussed above, the liquid crystal material formulation can include three liquid crystal components for full-color display. In addition, the liquid crystal material formulation of the invention can only include two liquid crystal components, such as crystal components (A) and (B), crystal components (A) and (C), or crystal components (B) and (C), for a color liquid crystal display, wherein the reflective wavelength difference between the two components has to be more than 50 nm. Further, the reflective liquid crystal material formulation of the invention can be applied in a black-and-white binary liquid crystal display.

The following are intended to illustrate the invention more fully without limiting their scope, since numerous modifications and variations will be apparent to those skilled in this art.

A liquid crystal display employing the reflective liquid crystal material formulation in an exemplary embodiment of the invention is disclosed as below in detail.

The reflective bistable liquid crystal display of the invention can include at least two electrode layers, and the aforementioned reflective liquid crystal material formulation disposed between the two electrode layers, wherein the liquid crystal components are isolated from each other, and the driving voltage difference of any two liquid crystal components is less than 4V.

Figure 3:
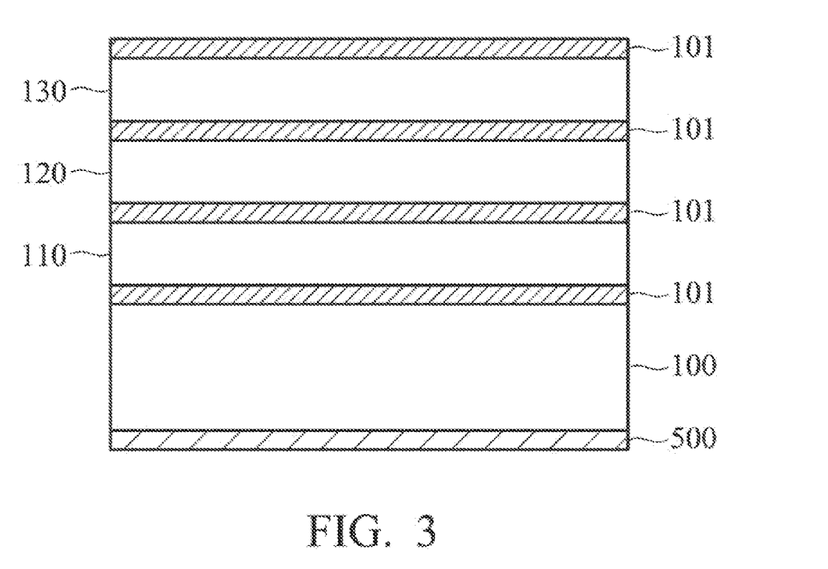
FIGS. 3-5 are cross-sections of reflective bistable liquid crystal display according to the invention.

In an embodiment, the reflective liquid crystal material formulation of the invention can be applied in a color display with stacked multi-layers, as shown in FIG. 3. Particularly, the color display with stacked multi-layers can include three stacked light modulating layers 110, 120, and 130 respectively including red, green, and blue cholesteric liquid crystal components (such as the aforementioned liquid crystal components (A), (B), and (C)). Each light modulating layer is disposed between the two transparent electrodes 101 for forcing the cholesteric liquid crystal to present a planar state or a focal conic state. Suitable materials of the transparent electrodes 101 can be Indium tin oxide (ITO) or indium zinc oxide (IZO).

The liquid crystal component of the invention can be coated directly on the transparent electrodes to serve as light modulating layers. Otherwise, before coating, the liquid crystal component can be mixed with a prepolymer (such as monomers) in advance. After polymerizing the prepolymer via irradiance or heat, phase separation has been observed during polymerization due to the reduction of the solubility among the prepolymer and the liquid crystal. Then, the liquid crystal (in microsphere form) is uniformly distributed among the polymer, obtaining a polymer dispersed cholesteric liquid crystal (PDChLC).

The substrate 100 can be a hard substrate, such as glass or quartz, or a flexible substrate for a flexible display. Suitable materials of the flexible substrate can be polyethylene naphthalate (PEN), polyethylene terephthalate (PET), polyamide, polymethylmethacrylate, polycarbonate, or polyurethane. Further, a light absorption layer 500 can be disposed under the substrate 100.

Figure 4:
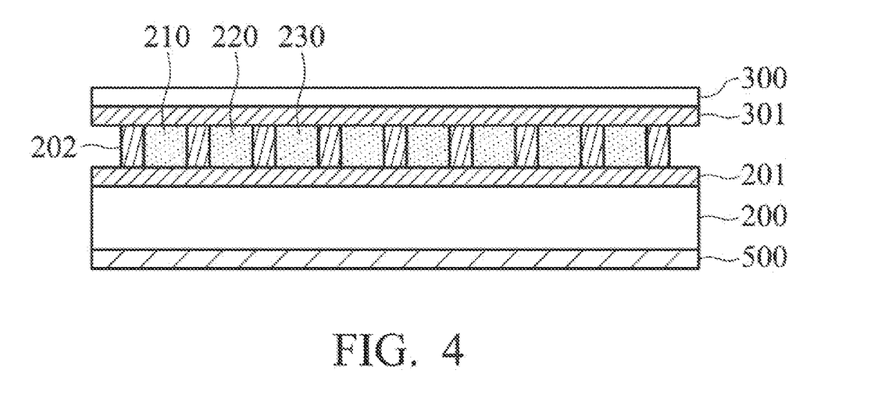

In another embodiment, the reflective liquid crystal material formulation of the invention is applied in a color display with a single layer, as shown in FIG. 4. The display at least includes a bottom substrate 200 with a bottom electrode layer 201. Spacers 202 (such as polymer) are disposed on the bottom electrode layer 201 to define several isolated cavities. The red, green, and blue cholesteric liquid crystal components 210, 220, and 230 can be injected into the cavities by ink-jet printing or vacuum injection molding. Next, a top electrode layer 301 is disposed on the spacers 202 to envelop the cavities. Further, a light absorption layer 500 can be disposed under the bottom substrate 200.

Figure 5:
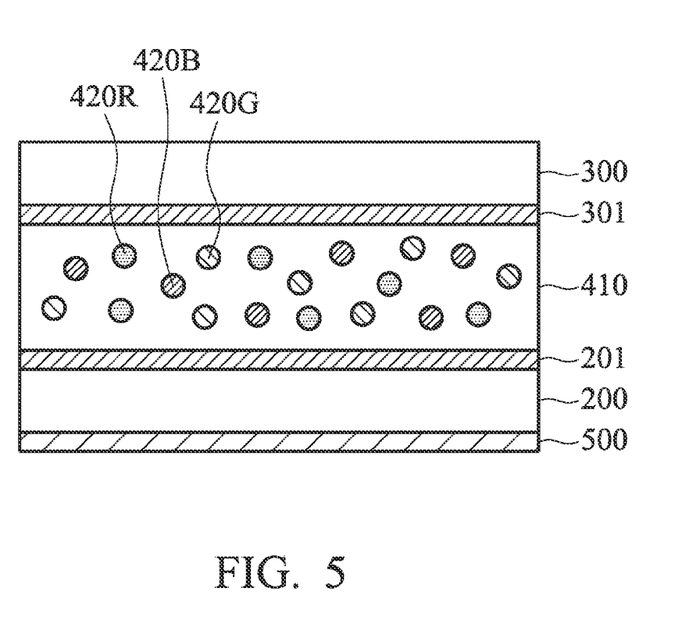

In yet another embodiment, the reflective liquid crystal material formulation of the invention is applied in a single color (black-and-white binary) display, as shown in FIG. 5. The display includes a top substrate 300 with a top electrode 301, a bottom substrate 200 with a bottom electrode 201, and a layer of polymer dispersed cholesteric liquid crystal (PDChLC) disposed between the top electrode 301 and the bottom electrode 201. A light absorption layer 500 can be disposed under the bottom substrate 200. The polymer dispersed cholesteric liquid crystal (PDChLC) includes simultaneously red, green, and blue cholesteric liquid crystal 420R, 420G, and 420B uniformly distributed among a polymer matrix 410 such as acrylic resin or epoxy resin.

It should be noted that the red, green, and blue cholesteric liquid crystal components 420R, 420G, and 420B can be operated via the same voltage difference between the top and bottom electrodes, thereby providing a color liquid crystal display.

Although there are three types of reflective bistable liquid crystal displays, the practical applications of the invention are not limited by above. The related fabrication of reflective bistable liquid crystal displays are also disclosed in U.S. Pat. No. 7,382,424, U.S. Pat. No. 7,119,859, U.S. Pat. No. 6,570,633, U.S. Pat. No. 6,356,323, US20060176257, and US20060119782.

The reflective bistable liquid crystal display of the invention can be implemented as a display device, such as a mobile phone, digital camera, PDA (personal data assistant), notebook computer, desktop computer, television, car display, or portable DVD player.

The following examples are intended to illustrate the invention more fully without limiting their scope, since numerous modifications and variations will be apparent to those skilled in this art. Unless specific definitions are provided, the symbol % disclosed as below represents weight percent.

PREPARATION EXAMPLES

The liquid crystal components disclosed in Examples and Comparative Examples are as discussed below in detail:

1) BL087, sold by Merck GmbH, with a dielectric anisotropy of about 17.

2) the components of the first component based formulation A (including compounds represented by formula (I) and formula (II)) has listed as following table:

| structure | % |
| --- | --- |
| $C_2H_5$—⟨phenyl⟩—⟨phenyl⟩—CN, which can be obtained from U.S. Pat. No. 4,780,242 and U.S. Pat. No. 5,114,614. | 12.6 |
| $C_5H_{11}$—⟨phenyl⟩—⟨phenyl⟩—CN, which can be obtained from U.S. Pat. No. 4,780,242 and U.S. Pat. No. 5,114,614. | 31.9 |
| $C_7H_{15}$—⟨phenyl⟩—⟨phenyl⟩—CN, which can be obtained from U.S. Pat. No. 4,780,242 and U.S. Pat. No. 5,114,614. | 21.8 |
| $C_5H_{11}$—⟨cyclohexyl⟩—⟨phenyl⟩—⟨phenyl⟩—CN, which can be obtained from U.S. Pat. No. 4,330,426 and U.S. Pat. No. 5,976,404. | 10.3 |
| $C_3H_7$—⟨cyclohexyl⟩—C(=O)—O—⟨phenyl⟩—⟨phenyl⟩—CN, which can be obtained from U.S. Pat. No. 4,780,242 and U.S. Pat. No. 5,114,614. | 10.0 |
| $C_5H_{11}$—⟨phenyl⟩—C(=O)—O—⟨phenyl⟩—⟨phenyl⟩—CN, which can be obtained from U.S. Pat. No. 4,576,733. | 6.2 |
| $C_3H_7$—⟨cyclohexyl⟩—⟨phenyl⟩—$OC_2H_5$, which can be obtained from U.S. Pat. No. 6,028,655. | 7.2 |

3) the components of the second component based formulation X (including compounds represented by formula (III)) has listed as following table:

| structure | % |
|---|---|
|  C₃H₇—⟨⟩—C(=O)—O—⟨⟩(F)(CN) which can be obtained from U.S. Pat. No. 4,576,733. | 40 |
|  C₃H₇—⟨cyclohexyl⟩—⟨⟩—C(=O)—O—⟨⟩(F)(CN) which can be obtained from U.S. Pat. No. 5,976,404 and U.S. Pat. No. 6,028,655. | 20 |
|  C₄H₉—⟨⟩—C(=O)—O—⟨⟩(F)(CN) which can be obtained from U.S. Pat. No. 4,576,733. | 40 |

4) the components of the second component based formulation Y including compounds represented by formula (III)) has listed as following table:

| structure | % |
|---|---|
|  C₃H₇—⟨⟩—C(=O)—O—⟨⟩(F)(CN) which can be obtained from U.S. Pat. No. 4,576,733. | 30 |
|  C₃H₇—⟨cyclohexyl⟩—⟨⟩—C(=O)—O—⟨⟩(F)(CN) which can be obtained from U.S. Pat. No. 5,976,404 and U.S. Pat. No. 6,028,655. | 20 |
|  C₅H₁₁—⟨⟩—C(=O)—O—⟨⟩(F)(CN) which can be obtained from U.S. Pat. No. 4,576,733. | 30 |
|  C₄H₉—⟨⟩—C(=O)—O—⟨⟩(F)(CN) which can be obtained from U.S. Pat. No. 4,576,733. | 10 |

| structure | % |
|---|---|
|  C₅H₁₁—⟨cyclohexyl⟩—⟨⟩—C(=O)—O—⟨⟩(F)(CN) which can be obtained from U.S. Pat. No. 5,976,404 and U.S. Pat. No. 6,028,655. | 10 |

The chiral agent (Z) including compounds represented by formula (IX) has a structure as below:

The chiral agent (Z) including compounds represented by formula (IX) can be obtained from U.S. Pat. No. 6,217,792. The process for preparing nematic liquid crystal and cholesteric liquid crystal includes the following steps: mixing components according to the specific ratio, heating the mixture over the temperature of the clearing point, and cooling.

The dielectric anisotropy of the reflective liquid crystal material formulation is measured by LCAS (manufactured and sold by LC-Version). The reflective spectrum of the liquid crystal material is measured by UV/VIS spectrophotometer. The reflective spectrum and V-R curve of the display employing the reflective liquid crystal material formulation is measured by DMS-803 (manufactured and sold by Autronic Melchers).

Comparative Example 1

In Comparative Example 1, the color liquid crystal material formulation employs the first component based formulation A and the chiral agent (Z). The following table shows the ratio between the first component A and the chiral agent Z and the driving voltage of the respective red, green, and blue cholesteric liquid crystal components of the material formulation.

| | $\lambda$max | first component A (%) | chiral agent Z (%) | driving voltage (V) |
|---|---|---|---|---|
| Red | 670 | 95.6 | 4.4 | 23.2 |
| Green | 540 | 94.6 | 5.4 | 27.6 |
| blue | 440 | 93.2 | 6.8 | 33.1 |

As shown in the above table, the driving voltages increases depending on the amount of chiral agent added. Therefore, due to the driving voltage difference of the red, green, and blue cholesteric liquid crystal components of about 4-5V, the display employing the reflective liquid crystal material formulation should be operated by three different driving voltages.

Example 1

In Example 1, the color liquid crystal material formulation employs the first component based formulation A and the second component formulation X. The following table shows the ratio between the components and the chiral agent Z and the driving voltage of the respective red, green, and blue cholesteric liquid crystal components of the material formulation.

|  | λmax | first component A (%) | second component X (%) | chiral agent Z (%) | driving voltage (V) |
|---|---|---|---|---|---|
| Red | 670 | 95.6 | 0 | 4.4 | 23.2 |
| Green | 540 | 74.6 | 20.4 | 5.1 | 23.6 |
| blue | 440 | 43.8 | 50.2 | 6.0 | 23.8 |

As shown in the above table, after the addition of the second component formulation X, the driving voltage of each red, green, and blue cholesteric liquid crystal component is reduced and the driving voltage difference of the red, green, and blue cholesteric liquid crystal components is reduced to less than 1V. Therefore, the display employing the reflective liquid crystal material formulation can be operated by a single driving voltage.

Comparative Example 2

In Comparative Example 2, the color liquid crystal material formulation employs the liquid crystal BL087 and the chiral agent (Z). The following table shows the ratio between the liquid crystal BL087 and the chiral agent Z and the driving voltage of the respective red, green, and blue cholesteric liquid crystal components of the material formulation.

|  | λmax | BL087 (%) | chiral agent Z (%) | driving voltage |
|---|---|---|---|---|
| Red | 650 | 95.5 | 4.5 | 22.8 |
| Green | 530 | 94.4 | 5.6 | 27.3 |
| blue | 480 | 93.8 | 6.2 | 29.2 |

The driving voltage measurement results of Comparative Example 2 are similar to that of the Comparative Example 1. The driving voltages increases depending on the amount of chiral agent added. Therefore, the display employing the reflective liquid crystal material formulation should be operated by three different driving voltages.

Example 2

In Example 2, the color liquid crystal material formulation employs the liquid crystal BL087 and the second component formulation X. The following table shows the ratio between the component and the chiral agent Z and the driving voltage of the respective red, green, and blue cholesteric liquid crystal components of the material formulation.

|  | λmax | BL087 (%) | second component X (%) | chiral agent Z (%) | driving voltage (V) |
|---|---|---|---|---|---|
| Red | 650 | 95.5 | 0 | 4.5 | 22.8 |
| Green | 530 | 64.5 | 30.4 | 5.1 | 22.7 |
| blue | 460 | 38.7 | 55.7 | 5.6 | 22.4 |

Similar to Example 1, the driving voltage of red, green, and blue cholesteric liquid crystal component disclosed in Example 2 is reduced and the driving voltage difference of the red, green, and blue cholesteric liquid crystal components is reduced to less than 1V. Therefore, the display employing the reflective liquid crystal material formulation can be operated by a single driving voltage.

Example 3

In Example 3, the color liquid crystal material formulation employs the liquid crystal BL087 and the second component formulation Y. The following table shows the ratio between the component and the chiral agent Z and the driving voltage of the respective red, green, and blue cholesteric liquid crystal components of the material formulation.

|  | λmax | BL087 (%) | second component Y (%) | chiral agent Z (%) | driving voltage |
|---|---|---|---|---|---|
| Red | 650 | 95.5 | 0 | 4.5 | 22.8 |
| Green | 530 | 58.8 | 36.3 | 4.9 | 23.1 |
| blue | 450 | 21.7 | 72.6 | 5.7 | 23.3 |

Likewise, the driving voltage of each red, green, and blue cholesteric liquid crystal component disclosed in Example 3 is reduced and the driving voltage difference of the red, green, and blue cholesteric liquid crystal components is reduced to less than 1V.

Example 4

Figure 6:
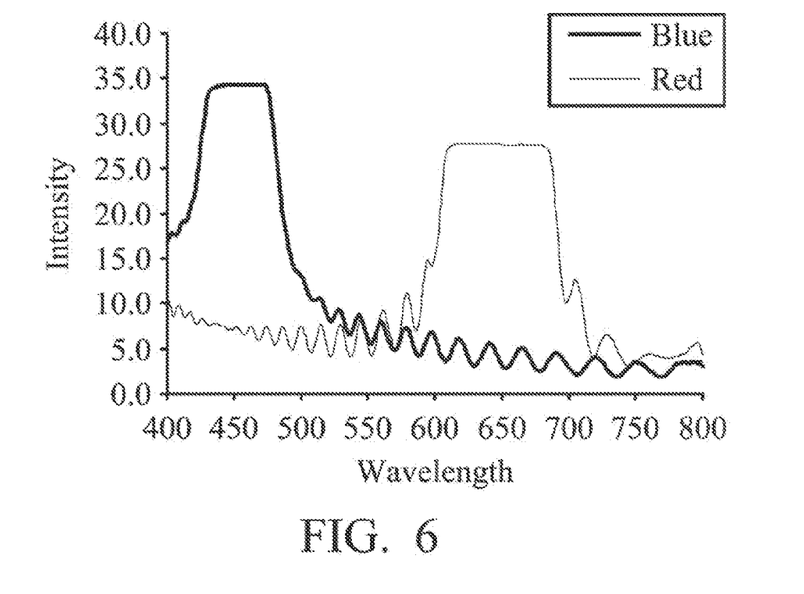
FIG. 6 shows the independent reflective spectrums of the red and blue liquid crystal components of Example 3.

Two liquid crystal cell (respectively including two transparent substrates and electrodes formed thereon) were provided, and the red and blue liquid crystal component disclosed in Example 3 were respectively injected into the two liquid crystal cells. FIG. 6 shown the independent reflective spectrums thereof.

Figure 7:
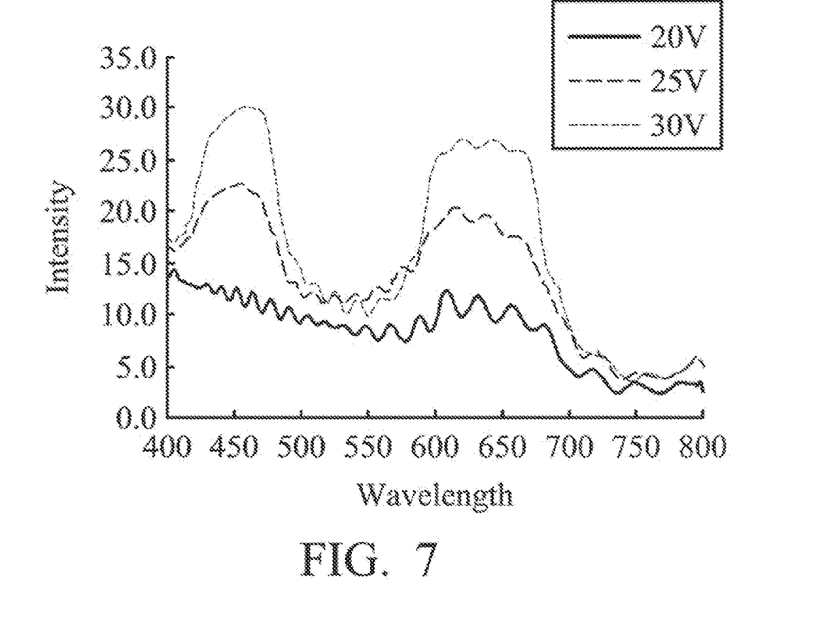
FIG. 7 the reflective spectrum of the stacked device simultaneously including the red and blue liquid crystal components of Example 3.

After overlapping the two liquid crystal cell, the reflective spectrum of the stacked device during 25V to 30V was measured. As shown in FIG. 7, the cholesteric liquid crystal components with different reflective colors can be operated by a single driving voltage.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A reflective liquid crystal material formulation, comprising at least two of (A) first liquid crystal component, (B) second liquid crystal component, and (C) third liquid crystal component,
   wherein
   (A) the first liquid crystal component having a first reflective wavelength comprises:
   100 parts by weight of a first liquid crystals host comprising 100% of a first component; and
   3-10 parts by weight of a first chiral agent;

(B) the second liquid crystal component having a second reflective wavelength comprises:
100 parts by weight of a second liquid crystals host comprising 60-80% of the first component and 20-40% of a second component; and
3-10 parts by weight of a second chiral agent; and
(C) the third liquid crystal component having a third reflective wavelength comprises:
100 parts by weight of a third liquid crystals host comprising 10-60% of the first component and 40-90% of the second component; and
3-10 parts by weight of a third chiral agent,
wherein the third liquid crystal component is different from the second liquid crystal component,
wherein the first component comprises a compound represented by formula (I) of and a compound represented by formula (II) of and the second component comprises a compound represented by formula (III) of wherein each $R^1$ is independent and is selected from a group consisting of hydrogen, $C_{1-15}$ straight or branched alkyl group, and $C_{1-15}$ straight or branched alkenyl group; one or more hydrogen atom bonded to the alkyl or alkenyl group is substituted optionally by a halogen atom, cyano group, or perfluoromethyl group; and one or more —$CH_2$— of the alkyl or alkenyl group is substituted optionally by —O—, —S—, $R^2$ is selected from a group consisting of hydrogen, $C_{1-15}$ straight or branched alkyl group, and $C_{1-15}$ straight or branched alkenyl group; one or more hydrogen atom bonded to the alkyl or alkenyl group is substituted optionally by a halogen atom, cyano group, or perfluoromethyl group; and one or more —$CH_2$— of the alkyl or alkenyl group is substituted optionally by —O—, —S—,

A and B are independent and selected from a group consisting of trans-1,4-cyclohexylene, and 1,4-phenylene; one or more —CH2— of A and B is substituted optionally by —O—, or —NH—; one or more =CH— of A and B is substituted optionally by =N—; and one or more hydrogen atom of A and B is substituted optionally by a halogen atom, cyano group, or perfluoromethyl group;

each $Z^1$ is independent and is selected from a group consisting of —$CH_2$—, —O—, —S—, —$CF_2O$—, —$OCF_2$—, —$CH_2CH_2$—, —$CF_2CF_2$—, cis or trans —C=C—, and —C≡C—;

each $Z^2$ is independent and is selected from a group consisting of single bond, —$CH_2$—, —O—, —S—, —$CF_2O$—, —$OCF_2$—, —$CH_2CH_2$—, —$CF_2CF_2$—, cis or trans —C=C—, and —C≡C—;

n is 0 or an integral of 1-3, m is 0 or an integral of 1-3, and the sum of n and m is 1-3; and L is hydrogen or fluorine.

2. The reflective liquid crystal material formulation as claimed in claim 1, wherein the first liquid crystals host has a dielectric anisotropy of less than 20, the second liquid crystals host has a dielectric anisotropy of between 20-25, and the third liquid crystals host has dielectric anisotropy of between 30-45.

3. The reflective liquid crystal material formulation as claimed in claim 1, wherein the difference between any two of the first reflective wavelength, the second reflective wavelength, and the third reflective wavelength is more than 50 nm.

4. The reflective liquid crystal material formulation as claimed in claim 1, wherein the first reflective wavelength corresponds to a wavelength of red light, the second reflective wavelength corresponds to a wavelength of green light, and the third reflective wavelength corresponds to a wavelength of blue light.

5. The reflective liquid crystal material formulation as claimed in claim 4, wherein the reflective liquid crystal material formulation comprises (A) first liquid crystal component and (B) second liquid crystal component.

6. The reflective liquid crystal material formulation as claimed in claim 4, wherein the reflective liquid crystal material formulation comprises (A) first liquid crystal component and (C) third liquid crystal component.

7. The reflective liquid crystal material formulation as claimed in claim 4, wherein the reflective liquid crystal material formulation comprises (B) second liquid crystal component and (C) third liquid crystal component.

8. The reflective liquid crystal material formulation as claimed in claim 4, wherein the reflective liquid crystal material formulation comprises (A) first liquid crystal component, (B) second liquid crystal component and (C) third liquid crystal component.

9. The reflective liquid crystal material formulation as claimed in claim 4, wherein (A) the first liquid crystal component, (B) the second liquid crystal component, and (C) the third liquid crystal component are dispersed in a polymer.

10. The reflective liquid crystal material formulation as claimed in claim 1, wherein the second component further comprises a compound represented by formula (IV) of:

(IV)

wherein $R^1$, A, B, $Z^1$, $Z^2$, n, and m are as defined in claim 1; X is fluorine, —$CF_3$, or —$OCF_3$; and $L^1$ and $L^2$ are independent and each is hydrogen or fluorine.

11. The reflective liquid crystal material formulation as claimed in claim 1, wherein the first chiral agent, the second chiral agent, and the third chiral agent are independent and selected from a group consisting of compounds represented by formula (V)-(XI):

(V)

(VI)

(VII)

(VIII)

(IX)

(X)

(XI)

wherein, each R is independent and is selected from a group consisting of hydrogen, $C_{1-15}$ straight or branched alkyl group, and $C_{1-15}$ straight or branched alkenyl group; one or more hydrogen atom bonded to the alkyl or alkenyl group is substituted optionally by a halogen atom, cyano group, or perfluoromethyl group; and one or more —$CH_2$— of the alkyl or alkenyl group is substituted optionally by —O—, —S—, A and B are independent and selected from a group consisting of trans-1,4-cyclohexylene, and 1,4-phenylene; one or more —$CH_2$— of A and B is substituted optionally by —O—, or —NH—; one or more =CH— of A and B is substituted optionally by =N—; and one or more hydrogen atom of A and B is substituted optionally by a halogen atom, cyano group, or perfluoromethyl group;

Z is independent and selected from a group consisting of —$CH_2$—, —O—, —S—,

—$CF_2O$—, —$OCF_2$—, —$CH_2CH_2$—, —$CF_2CF_2$—, cis or trans —C=C—, and —C≡C—; and n is independent and an integral of 1-2.

12. A reflective bistable liquid crystal display, comprising:
a first electrode layer;
a second electrode layer;
the reflective liquid crystal material formulation as claimed in claim 1 disposed between the first electrode layer and the second electrode layer,
wherein the liquid crystal components are isolated from each other, and the driving voltage difference of any two liquid crystal components is less than 4V.

13. The reflective bistable liquid crystal display as claimed in claim 12, wherein the liquid crystal components are isolated from each other by spacers.

14. The reflective bistable liquid crystal display as claimed in claim 12, further comprising at least a third electrode layer disposed between the first electrode layer and the second electrode layer, isolating the liquid crystal components.

15. The reflective bistable liquid crystal display as claimed in claim 12, wherein the liquid crystal components are dispersed in a polymer.

16. The reflective bistable liquid crystal display as claimed in claim 12, wherein the reflective bistable liquid crystal display is a black-and-white binary display.

17. The reflective bistable liquid crystal display as claimed in claim 12, wherein the reflective bistable liquid crystal display is a color display.

18. The reflective bistable liquid crystal display as claimed in claim 12, wherein the reflective bistable liquid crystal display is a full-color display.

* * * * *